May 22, 1956  S. F. HAWKINS  2,746,250
VENTURI CONTROL DEVICE FOR AIRCRAFT BRAKE SYSTEM
Filed June 17, 1952
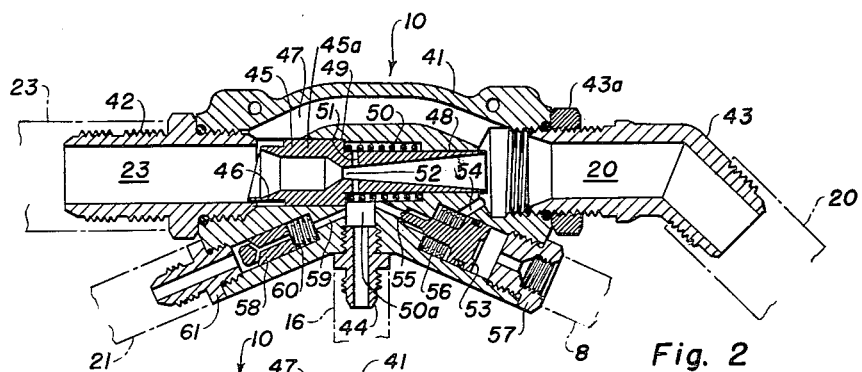
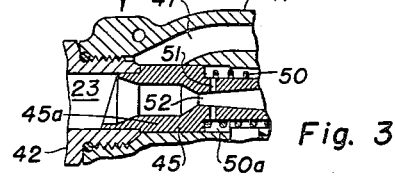
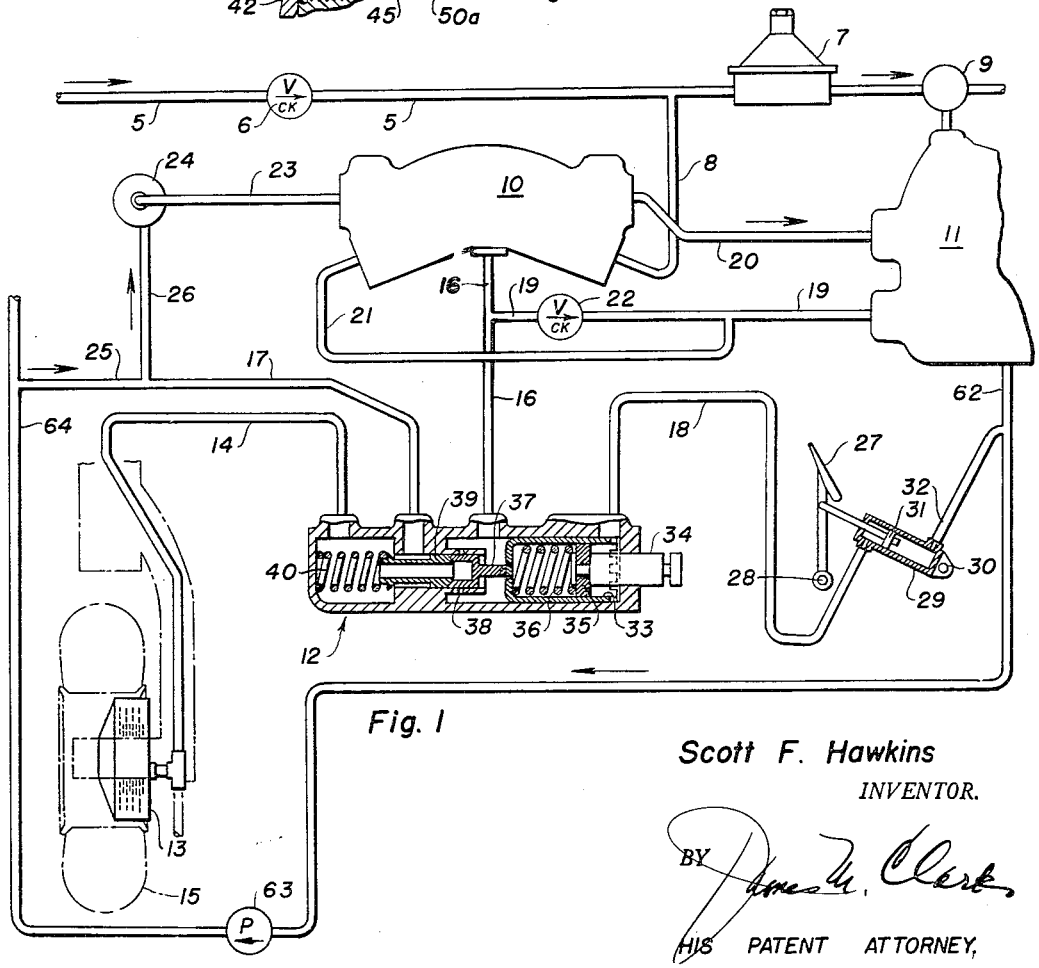
Scott F. Hawkins
INVENTOR.
BY *James M. Clark*
HIS PATENT ATTORNEY,

United States Patent Office 2,746,250
Patented May 22, 1956

2,746,250
VENTURI CONTROL DEVICE FOR AIRCRAFT BRAKE SYSTEM

Scott F. Hawkins, Los Angeles, Calif., assignor to North American Aviation, Inc.

Application June 17, 1952, Serial No. 294,104

5 Claims. (Cl. 60—51)

The present invention relates generally to aircraft brake systems and more particularly to improved means for the operation of pressurized hydraulic brake systems.

In the operation of highly pressurized hydraulic brake systems for aircraft, difficulties frequently have been encountered wherein the wheel brakes (particularly certain disc type brakes) fail to fully release subsequent to the application of the braking pressures. These failures to full release of the brakes are considered to be caused partially by the high initial system pressure, air pressurization of the hydraulic reservoir, static head effects and possibly to other causes. It has been proposed to overcome this sluggishness in the release of the brakes by applying a negative pressure, vacuum or suction on the return side of the brakes to assist in overcoming these difficulties. It has also been proposed to install a fixed Venturi device on the return side of the brakes but it has been found that such fixed Venturi devices create considerable back-pressure inasmuch as the flow rates increase materially during system operation and are subject to a considerable range or variation.

The present invention is directed primarily to an improved variable flow Venturi regulating device which is axially spring-biased into a by-pass closing condition at low rates of flow in such manner that increased flow rates result in partial by-passing of the fluid stream for maintaining a relatively stabilized degree of vacuum or negative pressure. The improved Venturi arrangement provides for reduced pressure at a substantially constant amount while maintaining back pressures within acceptable limits during operation over a wide range of flow rates. The present variable flow control unit provides a means for the recovery of residual fluids or the creation of reduced pressure zones ranging well into a vacuum. By reason of its variable flow characteristics the improved Venturi device maintains a stabilized efficiency through a wide range of flow. The present variable flow Venturi has proven particularly satisfactory in its particular application to the evacuation of the fluids from the chambers of the wheel brakes of aircraft, and other vehicles, to thereby effect complete brake releases which are not otherwise accomplished due to prevailing conditions and to reservoir pressurization and static fluid head conditions normally prevailing in such hydraulic systems. The improved Venturi valve produces a uniform reduction of pressure from a variable volume flow of either fluid or gas without a proportional increase in the resultant back-pressure normally encountered with increased volume or variations in flow.

In its application to the evacuation of the flow from wheel brake chambers in aircraft hydraulic brake systems, other problems arise in respect to maintaining predetermined pressure reduction and in eliminating aeration when the system reservoir may be unpressurized. These additional problems have been overcome and satisfactorily solved by the incorporation of novel relief valve means to maintain a given pressure reduction as well as by the inclusion in the Venturi arrangement of a second by-pass and relief valve whereby aeration of the fluid is prevented, the latter relief means being made ineffective when the system reservoir is pressurized. These and other objects of the present invention will occur to those skilled in the art after reading the present description taken in conjunction with the accompanying drawings, forming a part hereof, in which:

Fig. 1 is a diagrammatic showing of a portion of the hydraulic brake system of an aircraft within which the present improvements have been embodied;

Fig. 2 is a cross-sectional view of the improved variable flow Venturi and its associated parts showing the main by-pass and the normal relief means in their opened condition; and Fig. 3 is a fragmentary view of the same showing the main by-pass in its closed condition.

Referring now to Fig. 1, there is schematically indicated a portion of the main hydraulic system of an aircraft within which has been incorporated the improved variable flow Venturi valve device 10. It is customary in many modern aircraft to divide the complete hydraulic system into several individually operated systems to provide the required hydraulic power for the various fluid-actuated instrumentalities. Such power is not only required for the normal hydraulic brake system (a portion only of which is shown in Fig. 1) but also for the extension and retraction, and emergency lowering of the landing gear, the nose wheel steering system, hydraulic boost systems for the airplane control surfaces, and numerous other components which require hydraulic power for their operation. The main hydraulic system may preferably receive its high pressure fluid supply from one or more engine-driven constant-displacement pumps and usually has associated with it an emergency hydraulic system receiving its pressure supply from an electric motor-driven constant-displacement pump. In many such systems the fluid reservoir is also pressurized by subjecting it to a source of air pressure.

In Fig. 1, the numeral 5 represents the air pressurizing line with the air passing in the direction of the arrows through the check valve 6, with a branch line 8 to the variable flow Venturi unit 10 such that it receives air pressure from the supply line 5 on the high pressure side of the air pressure regulating valve 7. After passing through the regulating valve, the air is controlled by the pressurizing valve 9 as it passes into the upper portion of the hydraulic fluid reservoir 11 for pressurizing the fluid stored therein. As indicated above, the portion of the system schematically indicated in Fig. 1, is typical of a modified portion of a conventional closed-center type hydraulic pressure power system, in which has been shown for illustrative purposes only, a single brake pedal 27 for control of the brake unit 13 of a single wheel 15. It will, of course, be understood that the complete system will include like counterparts for use with the one or more other wheels of the aircraft which may require braking, as well as the customary pressure accumulators for storing a volume of fluid under pressure, pressure relief valves for preventing excessively high pressures, and other components not forming novel features of the present invention, and accordingly, not illustrated in the drawing.

The outlet of the hydraulic fluid reservoir 11 is connected by the conduit 62 to the suction side of one or more constant-displacement pumps 63 which discharge into the hydraulic pressure supply line 64. From the supply line 62 from the reservoir 11 a branch conduit 32 is provided to the master brake cylinder 29 for the brake toe pedal 27 pivotally mounted at 28. The cylinder 29 is also pivotally mounted at 30 and houses within it the piston 31 pivotally connected to the toe pedal 27 such that depression or movement of the latter to the left causes increase in pressure within the conduit 18 extending to the slave unit within the brake control valve assembly 12. This brake control valve is of a conventional type, which will be described below in further detail, and normally is provided with a connection 17 from the pressure supply branch conduit 25 which is in communication with the above-mentioned high pressure supply line 64. The brake control valve unit 12 is also in fluid communication by means of the conduit 14 with the wheel brake unit 13 on the wheel 15 and is also provided with a return conduit 16 which in the conventional system usually returns the relieved or return fluid directly back to the fluid reservoir 11.

As stated above, however, in many high pressure hydraulic fluid systems and particularly those in which the fluid reservoir is provded with air pressurization, and also in certain brake units 13 of the disc type, the brake units are frequently subjected to drag, or fail to release sufficiently rapidly, after application of the brakes due to integral frictions and from other causes. This drag, or failure to relieve has been overcome in the present system by running the return line directly to the improved Venturi device 10 in which a vacuum, or a negative pressure, is produced to assist in relieving the brake control valve 12, and a branch line 19 with a check valve 22 is provided for the return of the fluid to the fluid reservoir 11. A system unloading valve 24 is provided, being connected to the high pressure supply line 25 by the conduit 26, and when the system pressure reaches predetermined high pressures the excess fluid is passed through the unloading valve 24 into the discharge line 23 to the improved Venturi unit 10 and thence discharged through the conduit 20 to the fluid reservoir 11. A further relief line 21 extends from the return line 19 to the Venturi unit 10, being connected into the brake fluid return line 19 to the reservoir 11 and is effective to relieve the Venturi unit 10 at all times when the fluid reservoir 11 is air pressurized, and air pressure is passed through the conduit 8.

The brake control valve 12 includes the slave unit sleeve 33, between which and the piston 35, attached to the inner end of the plunger 34, there is disposed the main spring 36. The control valve 12 in this figure is connected for hydraulic slave operation from the pedal pressure line 18 and the exposed end of the plunger or push rod 34 is provided for mechanical actuation through alternate mechanical means, such as emergency or parking brakes, or for braking the retracted wheels by the installation of suitable bell-cranks and other mechanism in a lever mounting bracket (not shown) which may preferably be provided on the housing for the control valve. The opposite end of the control valve 12 is provided with a balanced poppet valve 39 which is biased into its closed position by the spring 40, there being an axially aligned but separate stem sleeve portion 37 controlling the relief openings 38 through which fluid passes from the line 14 from the brake units back through the hollow poppet valve and into the return line 16.

The operation of the brake control valve 12 is accordingly as follows: As manual or foot pressure is applied upon the toe pedal 27 to brake the wheel 15 by means of the brake units 13, the forward or counterclockwise rotation of the pedal lever about the pivot 28 draws the piston 31 forwardly to increase the pressure within the conduit 18 and within the slave portion within the adjacent end of the brake control valve 12. This increase in fluid pressure is transmitted to the piston 35, and through the spring 36 to the sleeve 33. As the slave assembly moves toward the left, it engages the separate stem 37 of the balanced poppet, closing the outlet ports 38 and opening the balanced poppet valve 39 against the opposition of the spring 40, as shown in Fig. 1. As the poppet valve is opened the high pressure from the supply line 17 is permitted to pass through the control valve out and around the poppet 39 and out through the conduit 14 to the wheel brake units 13 to effect the desired braking of the wheel 15.

As the pressure upon the pedal 27 is released and the fluid pressure within the conduit 18 drops correspondingly, the slave assembly 33—36 is moved to the right under the action of the spring 40 returning the balanced poppet valve 39 to its closed position, whereupon the fluid pressure from within the conduit 14 moves the separate stem sleeve portion 37, and the slave assembly 33—36 therewith, further to the right to thereby open the relief ports 38. The braking fluid within the conduit 14 is then permitted to flow through the hollow poppet valve and out through the relief ports 38 into the return line 16. The foregoing described operation of the control valve 12 is conventional, but such systems have not operated satisfactorily for the reasons outlined above, and in order to facilitate and insure rapid release of the brakes and return line 16 is connected to the improved Venturi device 10 of the present invention rather than directly to the reservoir 11 as has been the practice in most prior systems.

Referring now to Figs. 2 and 3, the Venturi fitting 10 is comprised essentially of a main body or housing portion 41 provided with suitable internally threaded openings to receive the inlet fitting 42, the outlet fitting 43 provided with the lock nut 43a and the connection fitting 44 for the vacuum line. The inlet fitting 42 is aligned with and adapted to be connected to the main line 23 from the system unloading valve 24, and the fitting 43 on the outlet side is arranged to receive the return conduit 20 to the hydraulic fluid reservoir 11. Within the body of the valve 10 there is slidably disposed within suitably bored portions 48 and 49 the Venturi piston unit 45 having a stepped or shouldered entrance portion which cooperates with the internal bore of the inlet fitting 42 to provide the Venturi by-pass valve 46 which controls flow through the by-pass 47 extending through the body 41 of the valve 10 and around the Venturi 45. The leading or piston portion 45a of the Venturi 45 is of slightly larger diameter than the aft portion, the leading and aft portions being respectively arranged to slide in the axial direction within the bores 49 and 48, respectively, within the housing 41. A compression spring 50 is interposed between these leading and aft portions to normally urge the Venturi 45 into its forward position in which the valve 46 is closed. The throat of the Venturi 45 is indicated by the reference numeral 52 and in the region of the throat there are provided a plurality of radial passages 51 opening into the chamber 50a occupied by the spring 50 and in communication with the reduced pressure inlet fitting 44 to the line 16. The by-pass or passage 47 accordingly circumvents the direct passage through the Venturi throat 52 and serves as a free passage for fluid in excess of that required to maintain the function of pressure or vacuum production. The Venturi piston portion 45a is so construed as to form, and more or less effectively isolate (except for the passages 51) the chamber 50a from the inlet 23 and the outlet 20. The degree of effective isolation is dependent upon the degree of reduction in pressure desired, the predetermined amount of leakage prevailing at either of these points reducing the effectiveness of the Venturi action as reflected at the port 44 for the chamber 50a.

In accordance with the characteristics and effects of the flow of fluid or gas at a predetermined rate through the constricting orifice 52 of the Venturi 45, a sufficient velocity is imparted to the fluid or gas to effect the action of pressure reduction within the chamber 50a as is characteristic of the Venturi function. The pressure required to force the fluid through the Venturi piston 45a, with the velocity required, will determine the force required of the spring 50 to hold the Venturi piston 45a in such position as will insure the continuance of the desired velocity. Additional volume of fluid imposed upon the Venturi 45 increases the pressure required to force its contraction through the Venturi orifice 52. This increased pressure acts upon the Venturi piston 45a causing the spring 50 to be compressed and thereby permitting the Venturi piston 45a to open the inlet 23 to the passage 47 allowing the increased volume to bypass the restricting orifice, thus eliminating the increased pressure while maintaining the desired function of the Venturi. The passage 47 is so designed as to allow the by-passed fluid to enter the flow pattern at the outlet 20 with a force and direction which contributes to the efficiency of the Venturi action through the reduction of turbulence and back-pressure. The disclosed Venturi arrangement accordingly produces a uniform reduction of pressure from a variable volume flow of fluid or gas without a proportional increase in the resultant back-pressures normally encountered with such increased volumes.

In order to maintain a given pressure reduction within the chamber 50a, relief valve 58 is provided within a suitably bored portion of the Venturi valve body 41 in communication with the conduit 21 which is open to the return line 19 to the hydraulic fluid reservoir 11. The bore within which the relief valve 58 reciprocates is in communication with the passageway 59 which in turn is opened to the reduced pressure chamber 50a. The valve 58 is of the internally orificed poppet type and is normally urged into its closed position against the apertured seat provided by the fitting 61 by means of the compression spring 60. The valve 58 might be termed the normal relief valve which is used while the fluid reservoir 11 is air pressurized from the air pressure line 5. Excessive flow through the Venturi throat 52 and corresponding reduction of the pressure within the chamber 50a beyond a predetermined amount, or beyond such degree of reduction as will nullify the effectivity of the spring 60 to resist the external force acting upon the poppet valve 58 from within the conduit 21 will cause the valve 58 to open. When this predetermined point of reduced pressure is reached, the pressure differential between the conduit 21 and the chamber 50a causes the poppet relief valve 58 to move against the spring 60 under the urging of the external force, thereby admitting sufficient volume of fluid from the return line 19 to preclude any further reduction of pressure within the chamber 50a. Under such conditions, the relieving flow of fluid is obtained from the conduit 19 through the conduit 21 past and through the relief valve 58, the passageway 59 into the chamber 50a, and thence through the passages 51 into the stream flowing through the throat 52 of the Venturi 45. The relief valve 58 accordingly stabilizes the degree of pressure reduction achievable within the chamber 50a in the foregoing described manner.

In order to prevent and eliminate aeration of the system fluid at such times when the Venturi valve is operated and the reservoir is unpressurized by the air pressure, an emergency relief and by-pass valve is provided within the Venturi body 41. This emergency relief valve 53 is of the piston poppet type reciprocable within a bored portion of the Venturi body 41 to control the communication of the emergency by-pass passage 54 with the reduced pressure chamber 50a. The piston poppet 53 is normally urged or biased into its opened position by the compression spring 56. This spring 56 urges the piston portion of the poppet valve 53 outwardly or to the right in Fig. 2, and is opposed on the opposite side of the piston by the air pressure exerted from the conduit 8 in communication with the air pressurization line 5 and exerted through the orifice in the plug fitting 57 which is threaded into the Venturi body. The piston poppet valve 53 is provided with a fluted stem portion which enters the valving passage 55 communicating with the reduced pressure chamber 50a, and in the position shown in Fig. 2, the pressure of the air within the conduit 8 has moved the piston of the poppet valve 53 toward the left against the opposition of the spring 56 and has closed the valve 55 such that the outlet 20 of the Venturi is not in communication through the by-pass 54 with the reduced pressure chamber 50a. Accordingly, at such times under normal operation when the fluid reservoir 11 is pressurized from the air pressure line 5, the emergency relief valve 53 is closed and the normal relief valve 58 is permitted to resume its normal function in cooperation with the air pressurized reservoir fluid supply through the conduits 19 and 21.

In the foregoing brake system, which has been selected for purposes of explaining the application of the improved Venturi device, as well as the improved brake system which results therefrom, the pressure is supplied by the pump 63 at approximately 3000 p. s. i. When the pedal 27 is depressed the master cylinder 29 operates to build up pressures to a maximum of approximately 300 p. s. i. in the brake control line 18 to the power brake control valve 12. Actuation of the latter admits pressure from the main supply line 64 which may vary within a range of from 560 to 600 p. s. i. working against the balancing spring in the power brake valve which regulates the maximum brake pressure. The pressure supply to the brake assemblies will vary proportionally to the amount of pressure applied to the power brake valve by the master cylinder. The pressure regulator 24 preferably unloads the pump 63 until the system pressure drops to 2700 p. s. i. at which the regulator is repositioned and starts reloading the system. These pressures may, of course, be varied to suit the particular requirements of a given installation.

It will, accordingly, be seen that the variable flow Venturi valve 10 is provided with both normal and emergency relief valves which serve to stabilize the degree of pressure reduction and prevent such aspirating effects and reductions in pressure which might otherwise be induced by the Venturi action to such an extent as to cause air to be drawn past the seals and into the brake cylinders thereby causing aeration of the hydraulic fluid. It will also be noted that the Venturi unit makes provision for the possibility of the loss of air pressure on the hydraulic fluid reservoir by automatically putting into operation the emergency piston poppet relief valve 53 and the second emergency by-pass 54.

The brake valve 12 is of the "load feel" type, i. e. the pressure applied to the brake is in direct proportion to the force applied to the brake valve through the master slave system. The application of the valve has been described above and the release of the valve is materially improved by the disclosed Venturi device. As has been indicated above, it is the return pressure escaping through the return ports 38 and the conduit 16 with which the present invention is primarily concerned, as residual pressures imposed by the system check valves and the reservoir pressurization usually exceed the power of the brake return springs. Unless these residual pressures are relieved, the brakes will not effect a full release thereby causing the brakes to drag, and requiring greater power and thrust from the aircraft power plant in order to perform ground taxi and take-off runs. The inclusion of the improved Venturi device disclosed herein in the brake return systems however enables the evacuation of these residual pressures to thereby avoid these conditions and permit rapid release of the brakes.

The variable flow Venturi arrangement shown and described provides a very satisfactory means for the recovery of the residual fluid and the creation of reduced pressure zones ranging well into a vacuum, and by reason of variable flow characteristics within the system it will maintain a stabilized efficiency through a wide range of flow rates. The improved Venturi unit has been shown and described in the specific application of evacuating the fluid from the wheel brake chambers in which it effects a complete brake release which has not been otherwise possible due to reservoir pressurization and static fluid head. It will, however, be appreciated that the improved Venturi unit disclosed herein is applicable to many other installations where partial vacuums or reduction in pressures are desirable or required. The disclosed Venturi valve also produces a uniform reduction of pressure from a variable volume flow of fluid or gas without a proportional increase in the resultant back-pressures normally encountered with increased volumes or higher rates of flow.

Other forms and modifications of the present invention which will occur to those skilled in the art, after reading the foregoing specification, are intended to come within the scope and spirit of the present invention as more particularly set forth in the appended claims.

I claim:

1. In a Venturi flow control device having a housing provided with an inlet and an outlet, a Venturi element slidably mounted within said housing, resilient means interposed between said housing and said Venturi element and operative thereon to bias the Venturi in one direction of its movement, a passage connecting said inlet with said outlet and arranged to by-pass the Venturi element and having a port constituting the entrance to said by-pass automatically controlled by said sliding Venturi element to regulate the effectiveness of said Venturi element under increased flow rates, a reduced pressure chamber formed within the housing, means providing fluid communication between the reduced pressure chamber and the throat of said Venturi, normal relief means comprising a passageway leading inwardly through the housing into the reduced pressure chamber, a relief valve disposed therein and adapted to permit flow into said reduced pressure chamber for stabilizing reduced pressures developed within said chamber and preventing their falling below a predetermined amount, emergency by-pass and emergency relief means comprising a passageway providing communication between the outlet of said device and said reduced pressure chamber, and a valve disposed in said second passageway adapted to permit flow into said reduced pressure chamber for supplementing the stabilizing effects of said normal relief means.

2. A Venturi flow control device comprising a piston-type Venturi member slidably mounted within the device, said device having an inlet and an outlet, resilient means interposed between said device and said Venturi member, a passage arranged to by-pass said Venturi member by interconnecting the inlet and outlet, flow through said passage being automatically controlled by said sliding Venturi member under the influence of said resilient means for regulating the effects of said Venturi member under increased flow rates, a reduced pressure chamber formed between said sliding Venturi member and said device, means forming a passageway into said reduced pressure chamber including a normal relief valve arranged to permit secondary flow into said reduced pressure chamber for stabilizing said reduced pressures and preventing their falling below a predetermined amount, emergency by-pass and relief means comprising a passageway providing communication between the outlet of said device and said reduced pressure chamber, and a valve disposed in said passageway arranged to permit secondary flow into said reduced pressure chamber for supplementing the stabilizing effects of said normal relief valve means.

3. In a regulating device, the combination with a housing having an inlet and an outlet, said housing having bored portions disposed between said inlet and said outlet, by-pass means extending between said inlet and said outlet, a Venturi member slidably mounted in said bored portions of said housing, a fluid pressure chamber formed between said housing and said Venturi member, said Venturi member having a throat portion in communication with said fluid chamber whereby a reduced pressure is established in said chamber, communication between said housing inlet and said by-pass means controlled by sliding movement of said Venturi member, resilient means arranged to move said Venturi member toward said by-pass means closing position of said Venturi member, an operative connection from said fluid chamber to a device to be influenced by the reduced pressure existing in said chamber, a passageway leading from the exterior through the said housing to terminate in said fluid chamber, a first relief valve disposed in said passageway adapted to control flow into said chamber, a second passageway leading from said fluid chamber to terminate in said outlet, and a second relief valve disposed in said second passageway adapted to control communication between the fluid chamber and the outlet.

4. In a device for evacuating fluid from a chamber, a housing having an inlet, an outlet, and a bore portion disposed between said inlet and said outlet, a Venturi member slidably mounted within said bore portion and forming therewith a reduced pressure chamber in communication with the throat portion of said Venturi and said other chamber, a passage formed in said housing adapted to communicate with said inlet and said outlet through ports in the wall of said bore respectively located upstream and downstream from the Venturi location and thereby defining a by-pass around the Venturi, resilient means arranged to move the Venturi toward said inlet into a by-pass closing position overlying one of said ports, normal relief means comprising a passageway extending through said casing into the reduced pressure chamber, a valve located in said passageway adapted to permit fluid flow at certain times into the reduced pressure chamber to stabilize the pressure level therein, emergency by-pass and relief means comprising a passageway through said housing leading from said reduced pressure chamber to said outlet, and a valve disposed in the second said passageway adapted to permit flow into the reduced pressure chamber under certain conditions for supplementing the stabilizing effects of said normal relief means.

5. In a fluid system for operating a single acting motor, including a pressurized reservoir, a return line from said motor connected to said reservoir, and a pressure line connected to said reservoir for the purpose of operating the motor, a device adapted for connection to the pressure line and to the reservoir in parallel with the motor and having in addition a connection to the return line to establish a reduced pressure therein for the purpose of facilitating the return stroke of the single acting motor, the said device comprising a housing having an inlet, an outlet, and a bore portion disposed between said inlet and said outlet, a Venturi member slidably mounted within said bore portion, a passage adapted to by-pass said Venturi, resilient means arranged to move said Venturi toward the inlet into a by-pass closing position wherein the Venturi overlies the by-pass entrance, a reduced pressure chamber formed between said Venturi member and said bore portion, a duct interconnecting the throat of the Venturi and said reduced pressure chamber, and a fluid connector provided for the reduced pressure chamber adapted to permit connection to the return line of the fluid system.

References Cited in the file of this patent

UNITED STATES PATENTS

| | | |
|---|---|---|
| 1,573,689 | Dumraese | Feb. 16, 1926 |
| 2,182,047 | Eaton | Dec. 5, 1939 |
| 2,326,598 | Acosta | Aug. 10, 1943 |
| 2,556,829 | Teague, Jr. | June 12, 1951 |
| 2,569,782 | Sloane | Oct. 2, 1951 |
| 2,617,259 | Rockwell | Nov. 11, 1952 |
| 2,676,577 | Vanderpoel | Apr. 27, 1954 |

FOREIGN PATENTS

| | | |
|---|---|---|
| 589,095 | Great Britain | June 11, 1947 |